(12) United States Patent
Lu et al.

(10) Patent No.: US 8,570,003 B2
(45) Date of Patent: Oct. 29, 2013

(54) DOUBLE FED INDUCTION GENERATOR CONVERTER AND METHOD FOR SUPPRESSING TRANSIENT IN DEACTIVATION OF CROWBAR CIRCUIT FOR GRID FAULT RIDETHROUGH

(75) Inventors: Haihui Lu, Shanghai (CN); Zhenhuan Yuan, Shanghai (CN); Lixiang Wei, Whitefish Bay, WI (US); Russel Kerkman, Milwaukee, WI (US); Richard Lukaszewski, New Berlin, WI (US); Ahmed Mohamed Sayed Ahmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 377 days.

(21) Appl. No.: 13/085,639

(22) Filed: Apr. 13, 2011

(65) Prior Publication Data
US 2012/0262129 A1 Oct. 18, 2012

(51) Int. Cl.
*H02P 11/00* (2006.01)
*H02P 9/00* (2006.01)
*H02H 7/06* (2006.01)
*H02P 1/00* (2006.01)
*H02P 1/46* (2006.01)
*H02P 23/00* (2006.01)
*G05B 11/28* (2006.01)

(52) U.S. Cl.
USPC ............. 322/24; 318/268; 318/599; 318/701; 318/808

(58) Field of Classification Search
USPC ...................... 322/24; 318/268, 599, 701, 808
See application file for complete search history.

(56) References Cited

U.S. PATENT DOCUMENTS

| | | | | |
|---|---|---|---|---|
| 5,920,175 A * | 7/1999 | Jones et al. | ................... | 318/701 |
| 6,815,921 B1 * | 11/2004 | Trifilo et al. | .................. | 318/599 |
| 6,965,212 B1 * | 11/2005 | Wang et al. | .................... | 318/700 |
| 7,026,786 B2 * | 4/2006 | Trifilo | ........................... | 318/808 |
| 7,164,562 B2 | 1/2007 | Virtanen | ......................... | 361/20 |
| 7,868,581 B2 | 1/2011 | Qian et al. | .................... | 318/809 |
| 2005/0248301 A1 * | 11/2005 | Trifilo | ........................... | 318/268 |
| 2006/0192522 A1 | 8/2006 | Kerkman et al. | ............. | 318/812 |
| 2007/0216337 A1 | 9/2007 | Lu et al. | ......................... | 318/800 |
| 2007/0247099 A1 | 10/2007 | Lu et al. | ......................... | 318/461 |
| 2007/0268051 A1 | 11/2007 | Kerkman et al. | ............. | 327/175 |
| 2008/0067970 A1 | 3/2008 | Qian et al. | .................... | 318/805 |
| 2008/0067971 A1 | 3/2008 | Qian et al. | .................... | 318/812 |
| 2008/0203954 A1 | 8/2008 | Qian et al. | .................... | 318/490 |
| 2009/0058341 A1 | 3/2009 | Lu et al. | ......................... | 318/504 |

FOREIGN PATENT DOCUMENTS

EP 1 965 075 A1 9/2008
WO WO 2004/091085 A1 10/2004

* cited by examiner

*Primary Examiner* — Pedro J Cuevas
(74) *Attorney, Agent, or Firm* — Fay Sharpe LLP; Alexander Kuszewski; John M. Miller (57) ABSTRACT

A double fed induction generator (DFIG) system and controller are presented in which the rotor side converter is preloaded with one or more initial values for resuming regulated operation to counteract transients upon deactivation of the crowbar protection circuit to provide grid fault ride through.

20 Claims, 9 Drawing Sheets

DOUBLE FED INDUCTION GENERATOR CONVERTER AND METHOD FOR SUPPRESSING TRANSIENT IN DEACTIVATION OF CROWBAR CIRCUIT FOR GRID FAULT RIDETHROUGH

BACKGROUND

Wind energy systems are quickly becoming a popular form of power generation technology, and ongoing development is directed to providing wind-generated power to electrical grids. Power conversion systems are needed to adapt mechanical power generated by wind turbines to AC electric power in a form compatible with the grid. One type of conversion apparatus used in wind energy conversion systems (WECSs) is a double fed induction generator (DFIG) with a rotor driven by a turbine through a gearbox to supply power to a grid via stator connections. The DFIG rotor windings are connected to the grid via a back-to-back converter system having a rotor side converter connected between the rotor windings and a DC circuit, along with a grid side converter connected between the DC circuit and the grid. The system operates with the back-to-back converter drawing power from or supplying power to the rotor depending on the relationship of the rotor speed to the desired grid frequency. The system provides power to the grid via the stator windings with the rotor frequency often deviating from a nominal corresponding to the grid frequency. The back-to-back converter controls the rotor currents to adjust the active and reactive power fed to the grid from the stator independently of the rotor speed, and the DFIG generator is able to both import and export reactive power. This capability is advantageous in grid-tied systems as the DFIG system can be operated to support the grid during severe voltage disturbances (grid voltage sag conditions). This architecture also allows the generator to remain synchronized with the grid while the wind turbine speed changes, where variable speed wind turbines use the energy of the wind more efficiently than fixed speed turbines.

DFIG converters essentially operate in one of two modes, depending on the rotating speed of the rotor. For rotor speeds below the nominal rotational speed, some of the stator power is fed to the rotor via the converters, with the grid side converter stage operating as a rectifier to supply power to the intermediate circuit and the rotor side converter inverting the DC power to power the rotor windings. When the rotor speed is above the nominal value, rotor currents are used to power the intermediate circuit, and the grid side converter operates as an inverter to supply power to the grid.

The DFIG generator is typically constructed with significantly more rotor windings than stator windings such that the rotor currents are lower than the stator currents, allowing the use of a relatively small back-to-back converter, where the converter components are typically sized for operation within a certain rotor speed range. However, the DFIG rotor voltages are consequently higher than the stator and grid voltages, and thus the rotor side converter and intermediate circuit are particularly susceptible to voltage transients caused by grid disturbances. DFIGs therefore typically include a crowbar circuit connected to the rotor windings, which can activate a load to conduct rotor currents in the event of grid faults.

As WECSs become more prevalent, utility operators must ensure the reliability and efficiency of the power system, including compliance with grid connection codes applicable to distributed generators including wind power generators. One such requirement is the capability of WECSs to ride-through grid fault conditions without internal damage, while also providing some measure of remedial action to support the grid. Crowbar circuits are activated and the switches of the rotor side converter stage are opened upon detection of grid faults to protect the rotor and converter components from excessive voltage spikes.

However, the crowbar circuit needs to be deactivated while the grid fault continues, in order to allow the DFIG system to begin active regulation to prop up the grid to meet regulatory specifications for grid-tied operation. In this regard, restarting the rotor side converter allows provision of reactive current to the grid during the remainder of voltage sag type grid faults to help the grid to recover from the fault. However, voltage spikes caused by crowbar deactivation can prevent or hinder the ability to restart regulated operation of the back-to-back converter.

U.S. Pat. No. 7,164,562 to Virtanen, issued Jan. 16, 2007 attempts to solve this problem by using the rotor side converter switches to short-circuit the AC side of the converter to facilitate commutation of the crowbar protective switch so that normal operation can be resumed quickly after a failure situation. This approach, however, requires complicated converter control switching. EP 1 965 075 A1, published Sep. 3, 2008 describes a crowbar with multiple branches allowing control of rotor current with different strategies according to crowbar voltage, stator current, rotor current or DC-link voltage by sequential deactivation of the crowbar branches so that the rotor voltage is kept low enough that no current circulates towards DC-link intermediate circuit. This approach, however, requires extensive additional hardware and increases the cost and complexity of DFIG systems. Accordingly, there is a need for improved DFIG converters and techniques for wind energy systems by which energy derived from wind-driven machines can be converted to grid power while providing grid fault ride through capabilities with the ability to restart regulation for grid support after deactivation of a protective crowbar circuit.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter.

The present disclosure provides DFIG power conversion systems and control techniques in which the rotor side converter is preloaded with one or more initial values for resuming regulated operation so as to counteract transients upon deactivation of the crowbar protection circuit to facilitate ride through of grid faults. In certain illustrated embodiments, the output of an outer loop (power regulation loop) PI regulator is preloaded with initial values when crowbar is turned off, where the initial values are calculated according to steady-state relationships and sensed or measured stator current, with the sign of the stator current used in the computations being adjusted based on the polarity or direction of the voltage disturbance. By this operation, the system resumes regulation for helping to prop up a faulted grid and can also reset itself if the crowbar circuit is again activated upon grid sag clearance.

In accordance with one or more aspects of the disclosure, a DFIG system and a controller therefor are provided, in which a protection circuit is coupled with the rotor connection and operates in a first mode to connect a protection load to conduct current from the rotor leads of the DFIG to protect a first (rotor side) converter circuit and in a second mode to disconnect the protection load. A switching controller is provided, which has one or more rotor outer loop regulators and a pulse width modulation (PWM) component to provide rotor switching control signals to operate the rotor side converter. A preload component determines one or more preload values according to a stator current value and provides the switching controller with the preload value(s) to begin regulation when the protection circuit is deactivated.

In certain embodiments, the preload component selectively changes the sign of the stator current value according to the direction of a grid voltage disturbance. For instance, the preload component changes the stator current sign when the protection circuit is activated in response to a grid voltage sag occurrence, and leaves the stator current sign unchanged if the protection circuit is activated in response to a grid voltage sag clearance. In this manner, the rotor side regulation is resumed in a manner that counteracts the direction of the particular voltage disturbance. In certain embodiments, moreover, the preload component determines d-axis and q-axis preload values for the rotor outer loop regulation according to d-axis and q-axis stator current values, in which case the signs of both the d-axis and q-axis stator current values are changed when the protection circuit was activated in response to a grid voltage sag occurrence.

A method is provided for operating a dual stage DFIG converter in accordance with further aspects of the disclosure. The method involves activating a protection circuit to connect a load to the DFIG rotor, as well as monitoring at least one stator current value and/or stator voltage while the protection circuit is activated. The method further includes determining one or more rotor converter outer loop regulator output preload values based at least partially on the stator current value, and preloading the value to a rotor outer loop regulator to begin regulation of the DFIG when the protection circuit is deactivated. Certain embodiments of the method also include selectively changing the sign of the stator current value or values when the protection circuit is activated in response to a grid voltage sag occurrence. In certain embodiments, moreover, the method includes selectively changing the signs of both d-axis and q-axis stator current values when the protection circuit is activated in response to a grid voltage sag occurrence, and determining d-axis and q-axis rotor outer loop regulator output preload values based at least partially on the d-axis and q-axis stator current values of the DFIG.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Referring now to the figures, several embodiments or implementations of the present invention are hereinafter described in conjunction with the drawings, wherein like reference numerals are used to refer to like elements throughout, and wherein the various features are not necessarily drawn to scale.

Figure 1:
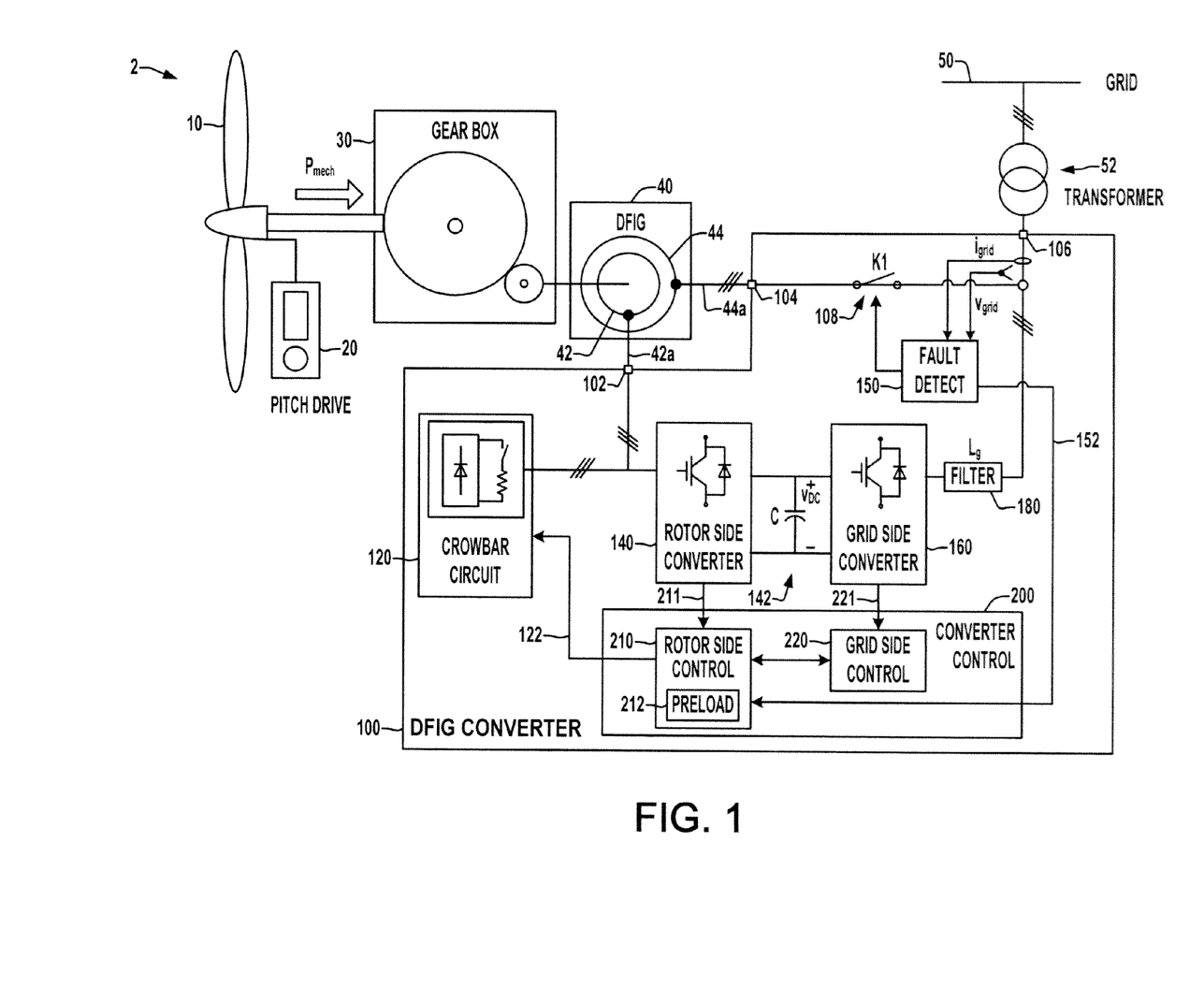
FIG. 1 is a schematic diagram illustrating an exemplary wind driven DFIG power conversion system with a preloader to provide one or more preload values for outer loop rotor regulation upon crowbar circuit deactivation in accordance with one or more aspects of the present disclosure.
Figure 2:
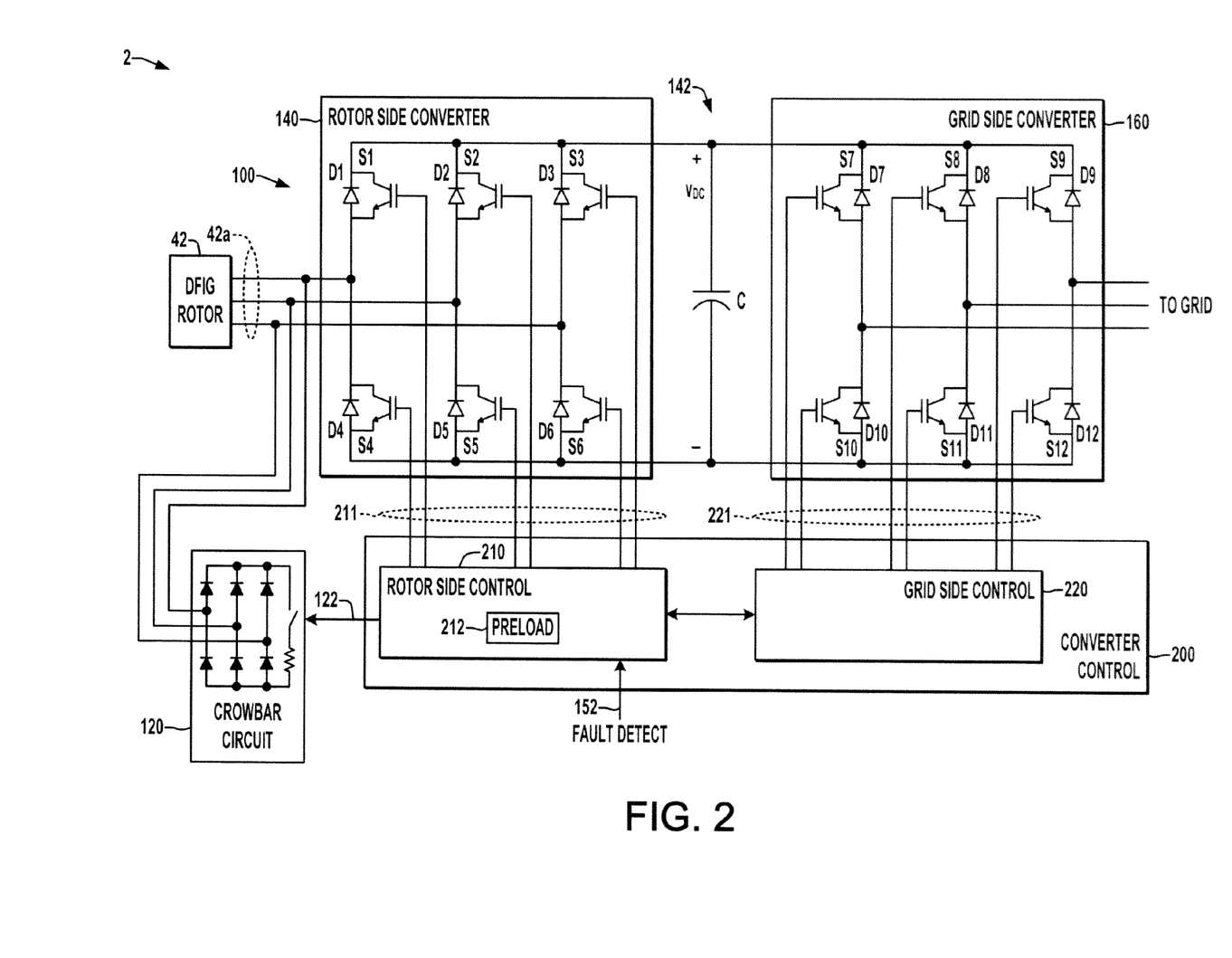
FIG. 2 is a schematic diagram illustrating further details of a back-to-back converter and crowbar protection circuit in the system of FIG. 1.
Figure 3:
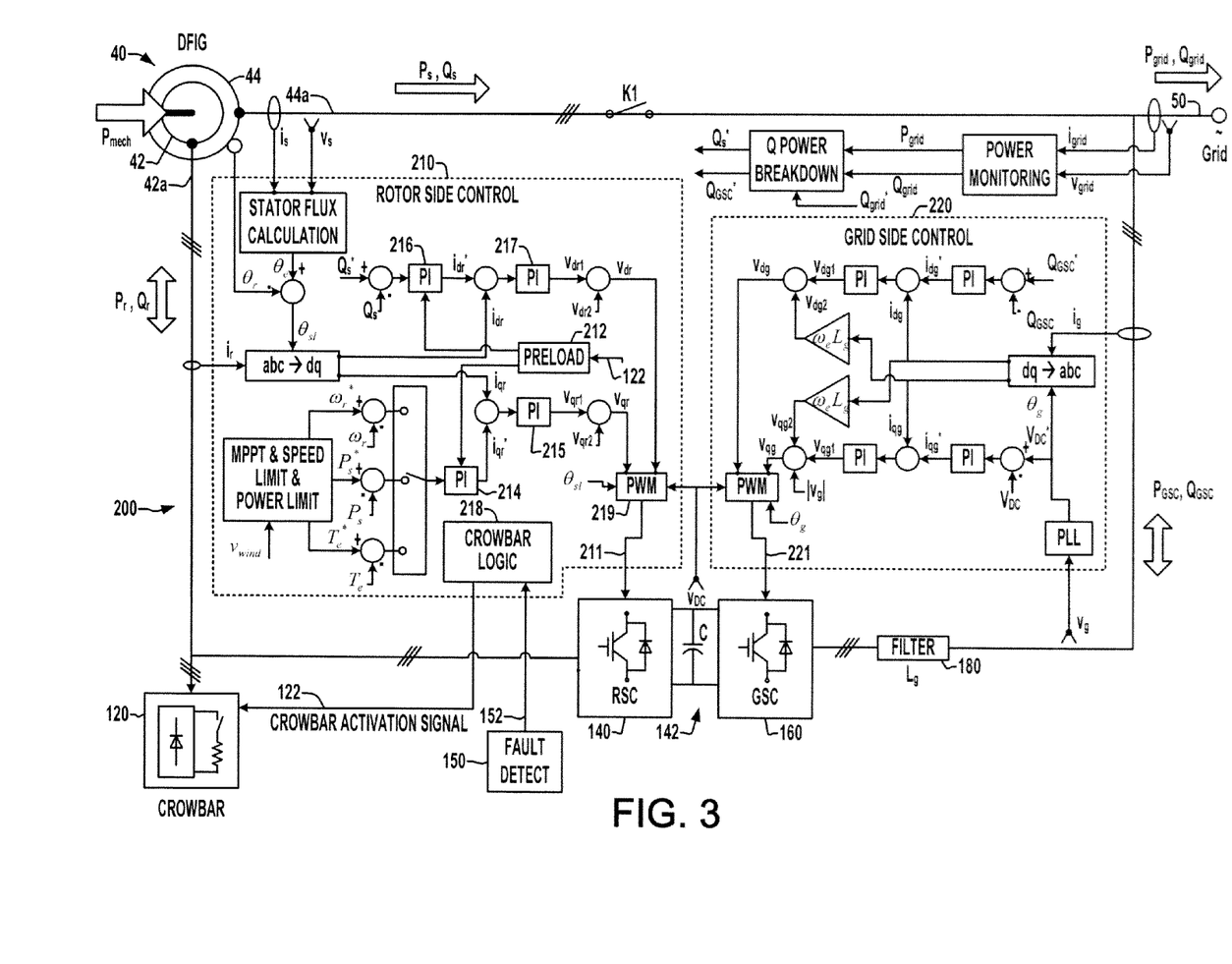
FIG. 3 is a schematic diagram illustrating further details of an exemplary DFIG converter controller in the system of FIGS. 1 and 2.

Referring initially to FIGS. 1-3, FIGS. 1 and 2 illustrate an exemplary wind energy converter (WEC) or wind energy system (WES) 2 with a double fed induction generator (DFIG) conversion system in accordance with various aspects of the present disclosure. The system 2 includes a turbine 10 with a pitch drive 20 providing rotational mechanical power $P_{mech}$ to drive a gear box 30 with an output shaft mechanically coupled to a rotor 42 of a DFIG generator 40 with a stator 44. The rotor 42 provides rotor windings 42a (single or multi-phase) for transfer of AC power between the rotor 42 and a back-to-back DFIG converter 100. The stator 44 has windings 44a coupled to an AC grid 50 through a circuit breaker 108 (K1) and a transformer 52. The DFIG 40 is coupled to the DFIG converter 100 via a rotor connection 102 of the converter 100 that includes single or multiphase electrical connections coupleable to the rotor leads 42a, as well as a stator connection 104 including electrical connections coupleable to the stator leads 44a. The converter 100 includes a grid connection 106 and may, but need not, include the transformer 52. In the illustrated embodiments, an internal connection is provided between the transformer lines at the grid connection 106, the circuit breaker 108 and a converter output filter 180 formed by line inductors $L_g$ or an LCL filter.

As best seen in FIG. 2, the converter 100 is a back-to-back structure with a first (rotor side) converter circuit 140 coupled between the rotor connection 102 and a DC intermediate circuit 142 providing a Dc bus with a capacitance C. As further shown in FIG. 2, the exemplary first converter circuit 140 includes a three-phase rectifier circuit including diodes D1-D6 and a first switching circuit with corresponding switching devices S1-S6 (e.g., IGBTs or other suitable switching devices) coupled between the rotor leads 42a and the DC bus terminals of the intermediate circuit 142. A second (grid side) converter circuit 160 is coupled between the stator connection 104 (via the breaker 108 and filter 180) and the DC circuit 142, and includes a second rectifier circuit with rectifier diodes D7-D12 and a second switching circuit with switches S7-S12 (e.g., IGBTs or other suitable switching devices).

The converter 100 operates in dual mode fashion with the rotor side converter circuit 140 providing power from the rotor connection 102 to the DC circuit 142 in a first mode and providing power from the DC circuit 142 to the rotor connection 102 in a second mode, with the switches S1-S6 being operated as a switching inverter. In the first mode, the grid side converter circuit 160 operates as an inverter to provide power from the DC circuit 142 to the stator connection 104 via switches S7-S12 and in the second mode, the circuit 160 rectifies power from the stator connection 104 to charge the DC circuit 142, where the rectifiers D7-D12 and the IGBTs work together to allow bidirectional power flow in the second (PWM switching) mode and the diodes D7-D12 act as freewheeling paths to the IGBTs S7-S12. The operational mode of the illustrated converter 100 is set according to the rotor speed, with current from the rotor windings 42a being used in the first mode to power the intermediate circuit 42 and the grid side converter operating as an inverter to supply power to the grid when the rotor speed is above the nominal value corresponding to the grid frequency. In the second mode for rotor speeds below the nominal rotational speed, a portion of the stator power is fed to the rotor 42 via the converter circuits 140, 160, with the grid side circuit 160 operating as a rectifier to supply power to the intermediate circuit 42 and the rotor side circuit 140 inverting the DC power provided to the rotor windings 42a.

To prevent damage to the rotor side converter 140, a protection circuit 120 is connected to the rotor lines 42a and when activated by a crowbar activation signal 122 connects a protection load to the rotor circuit to conduct current from the rotor leads 42a to protect the rotor side converter circuit 140. In a second mode (deactivated) mode, the protection load is disconnected from the rotor circuit to allow normal operation of the converter 100. Any form of protection circuit can be used which selectively connects or disconnects a load from one or more of the rotor lines, such as a crowbar circuit with or without a rectifier. In the embodiment of FIG. 2, the crowbar protection circuit 120 includes a three phase rectifier diode bridge having six diodes connected between the rotor lines and a DC circuit, where the DC side of the protection circuit 120 includes a resistive load in series with a switch. The switch of the crowbar protection circuit 120 is operated according to an externally provided crowbar activation signal 122, in one embodiment, provided by a converter controller 200. In certain embodiments, the system 100 includes a fault detection circuit 150 (FIG. 1) that provides a fault detect signal 152 which can be used to trigger activation of the protection circuit 120, and the control system 200 may include crowbar control logic 218 (FIG. 3) for activating and deactivating the crowbar circuit 120 based in whole or in part on the fault detect signal 152.

The converter 100 includes a converter control system 200 with a rotor side control component 210 and a grid side control component 220, as well as a preload component 212. In certain implementations, the control system 200 may have inputs for receiving a fault detect signal 152, feedback signals or values from one or more system sensors (not shown), and other information, data, etc., which may be in any suitable form such as an electrical signal, digital data, etc., and which may be received from any suitable source, such as an external network, switches, a user interface associated with the system 100, or other suitable source(s). The control system 200 and the components thereof may be any suitable form of hardware, processor-executed software, processor-executed firmware, logic, or combinations thereof that are adapted to implement the functions illustrated and described herein. In operation, the control system 200 operates the back-to-back converter stages 140 and 160 and the protection circuit 120 by providing control signals or values, with the rotor side control component 210 providing rotor switching control signals 211 to operate the rotor side converter switches S1-S6 and the grid side control component 220 providing switching control signals 221 to the switches S7-S12 of the second converter stage 160.

FIG. 3 illustrates details of an exemplary DFIG converter controller 200 in the system 100, including rotor and grid side portions 210 and 220, respectively, where command or setpoint values are indicated with an asterisk, 'd' and 'q' subscriptions denote d-axis and q-axis of the selected synchronous frame, respectively, stator-related variables are indicated with the subscript "s" and rotor variables are indicated with "r". In the diagram of FIG. 3, moreover, circles indicate summing junctions, current variables are indicated "i", voltages are indicated "v", active (real) power is indicated as "P", reactive power is indicated as "Q", torque is indicated as "T", angles are indicated as "θ", inductance values are indicated as "L", and rotational speeds or frequencies are indicated as "ω".

The rotor side controller 210 provides outer loop control regulators 214 and 216 for the "q" and "d" axis rotor currents and these outer loop regulators generate regulator outputs $i_{qr}*$ and $i_{dr}*$, respectively. In certain embodiments, the control regulators 214 and 216 are proportional/integral (PI) controllers, although not a strict requirement of the disclosure. The regulator output values $i_{qr}*$ and $i_{dr}*$ are then used as control setpoints for inner loop control via inner loop regulators 215 and 217 to ultimately provide inputs to a pulse width modulation (PWM) component 219 (e.g., including suitable driver circuitry) that provides the rotor side switching control signals 211 to operate the first switching circuit S1-S6. Thus, the rotor side converter circuit 140 is pulse width modulated by the controller 210 for inverter operation at least partially according to the regulator outputs $i_{dr}*$ and $i_{qr}*$ in the first mode to provide power from the rotor connection 102 to the DC circuit 142. The control components 140 and 160 receive various input values from feedback sensors (e.g., sensed grid, rotor, stator, and intermediate DC current and/or voltage values $i_g$, $v_g$, $i_{grid}$, $v_{grid}$, $i_r$, $i_s$, $v_s$, $v_{DC}$, etc.) as well as values derived from sensor signals in the system 100 and inputs from the turbine system (e.g., wind velocity $v_{wind}$).

In the illustrated embodiment, the rotor side controller 210 provides output loop regulation of a desired DFIG output power (e.g., stator active power $P_s$), or may regulate the DFIG rotor speed and/or torque (e.g., $\omega_r$, $T_e$) via the q-axis PI regulator 214 to provide an inner loop q-axis rotor current setpoint value $i_{qr}*$ and regulates reactive stator power (e.g., $Q_s$) by providing a q-axis rotor current setpoint $i_{dr}*$ using the outer loop d-axis PI regulator 216. The inner loop regulators 215 and 217 regulate the current about these setpoints $i_{qr}*$, $i_{dr}*$ based on q-axis and d-axis feedback values derived from the sensed rotor current $i_r$ converted from three phase sensed current values into q and d-axis values via a three-phase to dq reference frame converter component (abc→dq). The outputs of the inner loop PI regulators 215 and 217 provide voltage outputs that are offset and used as inputs to the PWM switch driver circuit 219 which generates pulse width modulated switch control signals 211 used to operate the rotor control switches S1-S6 based on the slip angle $\theta_{sl}$ and the voltage of the DC intermediate circuit 142 ($v_{DC}$), where the slip angle $\theta_{sl}$ is the difference between stator angle and the rotor angle.

The rotor side controller 210 also includes a preload component 212 that receives the crowbar activation signal 122 and selectively provides outer loop regulator output preload value $i_{qr}*$, $i_{dr}*$ to the outer loop regulators 214 and 216 to facilitate resumption of rotor side regulation when the crowbar circuit 120 is deactivated.

Figure 4:
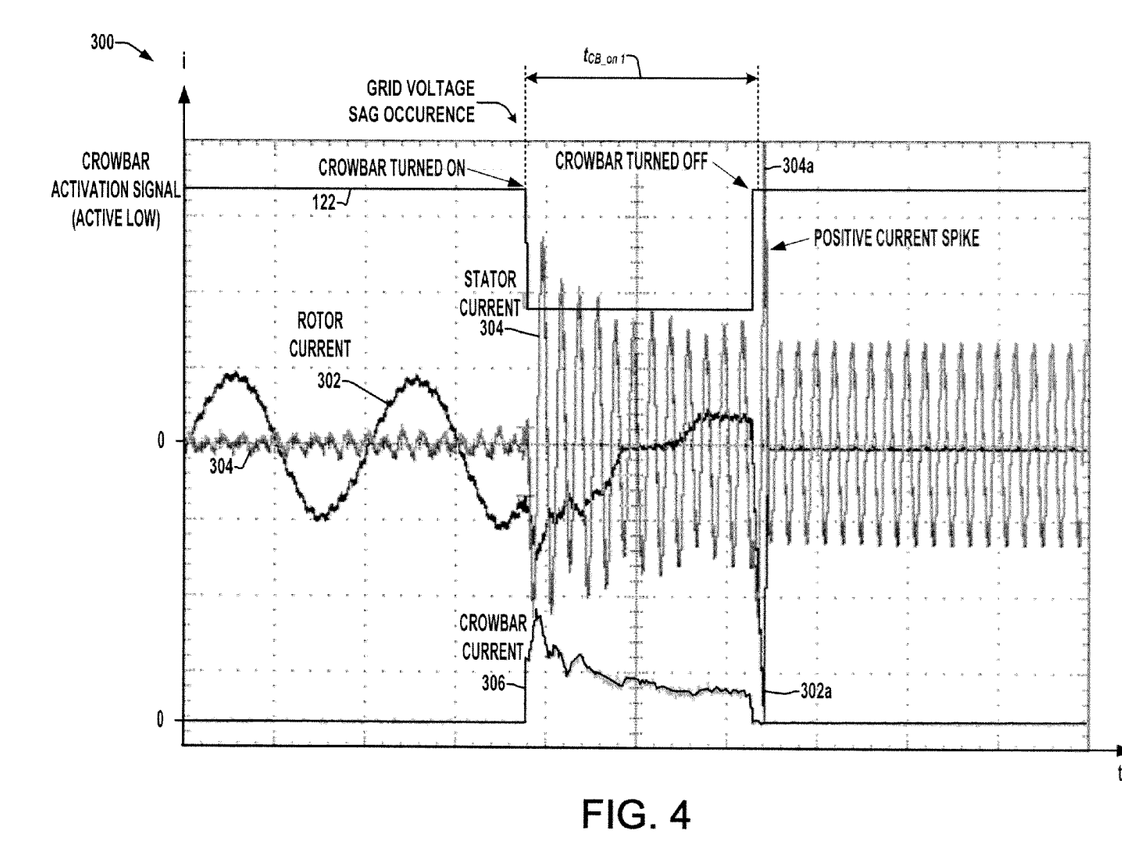
FIG. 4 is a graph illustrating exemplary current waveforms for operation of the crowbar protection circuit without preloading rotor control values.

FIG. 4 provides a graph 300 showing exemplary current waveforms in operation of the crowbar circuit 120 in response to a detected grid sag event, without operation of the preload circuit 212. A curve 122 shows an active-low crowbar activation signal generated by the rotor side controller 210 in response to a grid voltage sag fault signal 152 provided by the fault detection circuit 150 (FIG. 1) based on monitoring the grid voltage $v_{grid}$. When the fault is detected, the crowbar signal 122 goes low to turn on the protection circuit 120, thereby connecting the circuit load to the rotor windings 42a. This causes a crowbar current 306 to flow in the crowbar load path. The graph 300 also shows rotor and stator current waveforms 302 and 304, respectively, with the stator current 304 increasing in amplitude due to the effects of the grid fault, and with the rotor current transitioning from the pre-fault sinusoidal wave shape to a disrupted waveform due to activation of the crowbar circuit 120. It is noted in FIG. 4 that subsequent deactivation of the crowbar protection circuit (crowbar activation signal goes high again) leads to a positive spike 304a in the stator current curve, as well as a negative spike 302a in the rotor current caused by the deactivation of crowbar circuit 120. Absent remedial measures, the rotor side controller 210 would be unable to resume regulated operation due to these disturbances upon deactivation of the crowbar circuit, and thus the system 100 would be unable to help remedy the detected grid fault.

Figure 5:
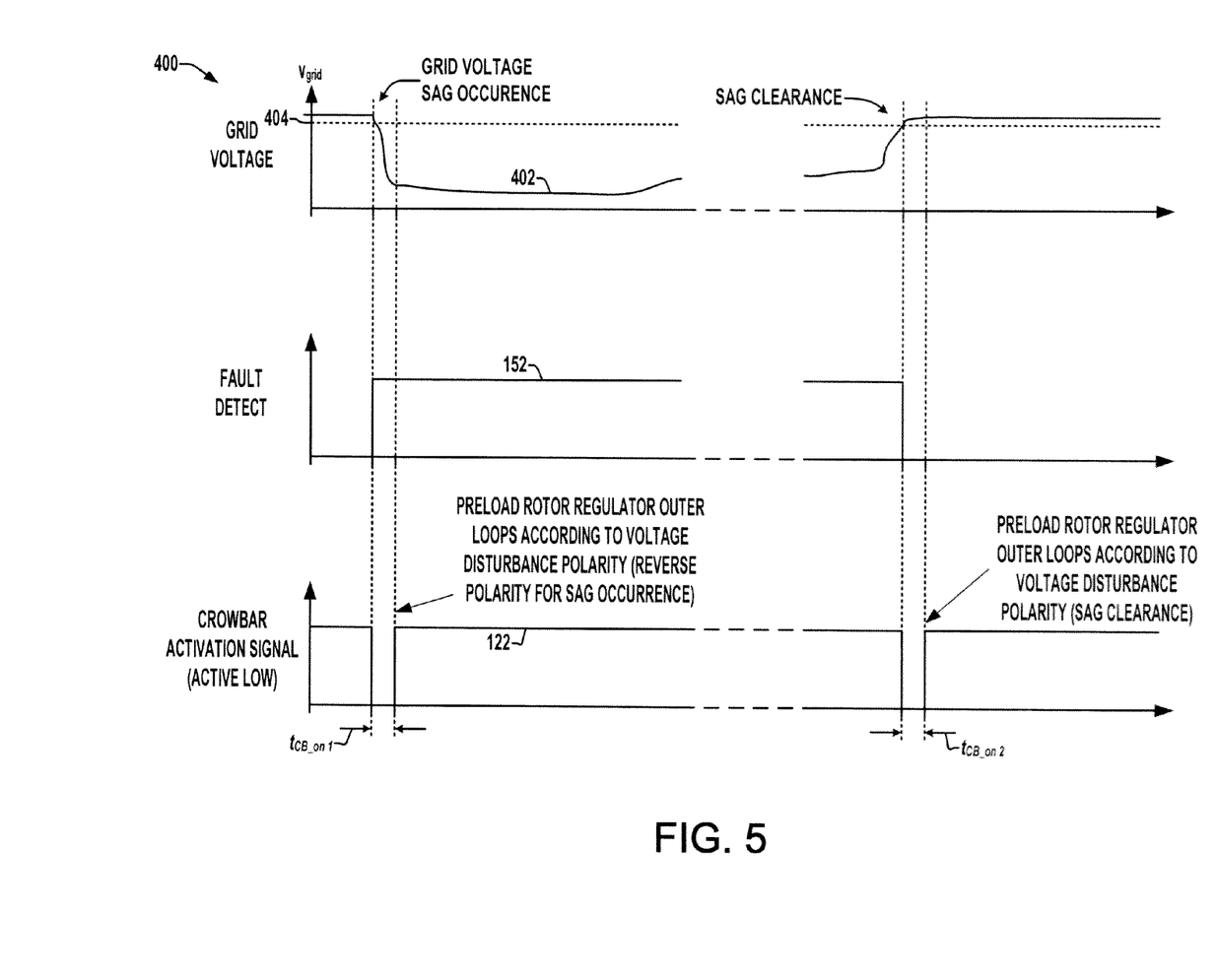
FIG. 5 is a graph illustrating a grid voltage sag type fault and exemplary fault detection and crowbar activation signals in the system of FIGS. 1-3.

As shown in FIG. 5, the control system 200 actuates the crowbar circuit 120 for a short period both when a grid voltage sag occurs and again when the voltage sag is cleared, in order to protect the rotor side controller 210. Graph 400 in this figure shows the grid voltage 402 which sags, causing the fault detection circuit 150 (FIG. 1) to activate the fault detect signal 152. In response, the controller 200 asserts the crowbar activation signal 122 (active low) for a first activation time period $t_{CB\_on\ 1}$, such as for a few hundred milliseconds, after which the crowbar circuit 120 is deactivated. Also, upon detecting clearance of the grid voltage sag, the fault detect signal 152 goes low and the controller 200 again activates the crowbar circuit 120 for a second time period $t_{CB\_on\ 2}$, after which the crowbar circuit 120 is again deactivated.

Figure 6:
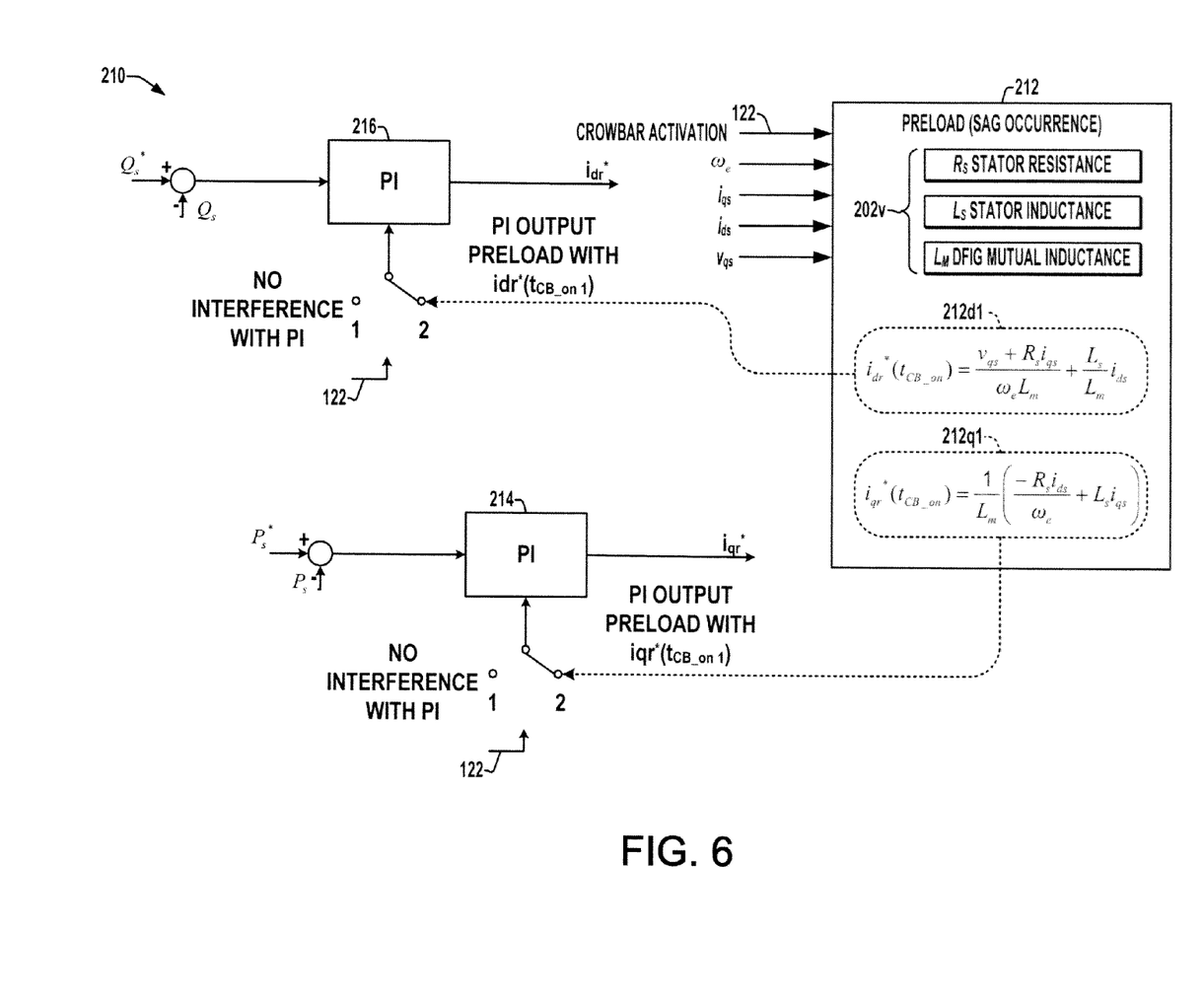
FIGS. 6 and 7 are partial simplified schematic diagrams illustrating exemplary d-axis and q-axis rotor outer loop regulators and a preload component that computes and provides regulator initial values for resuming rotor regulation when the crowbar circuit is deactivated following a grid sag occurrence and a sag clearance, respectively.
Figure 7:
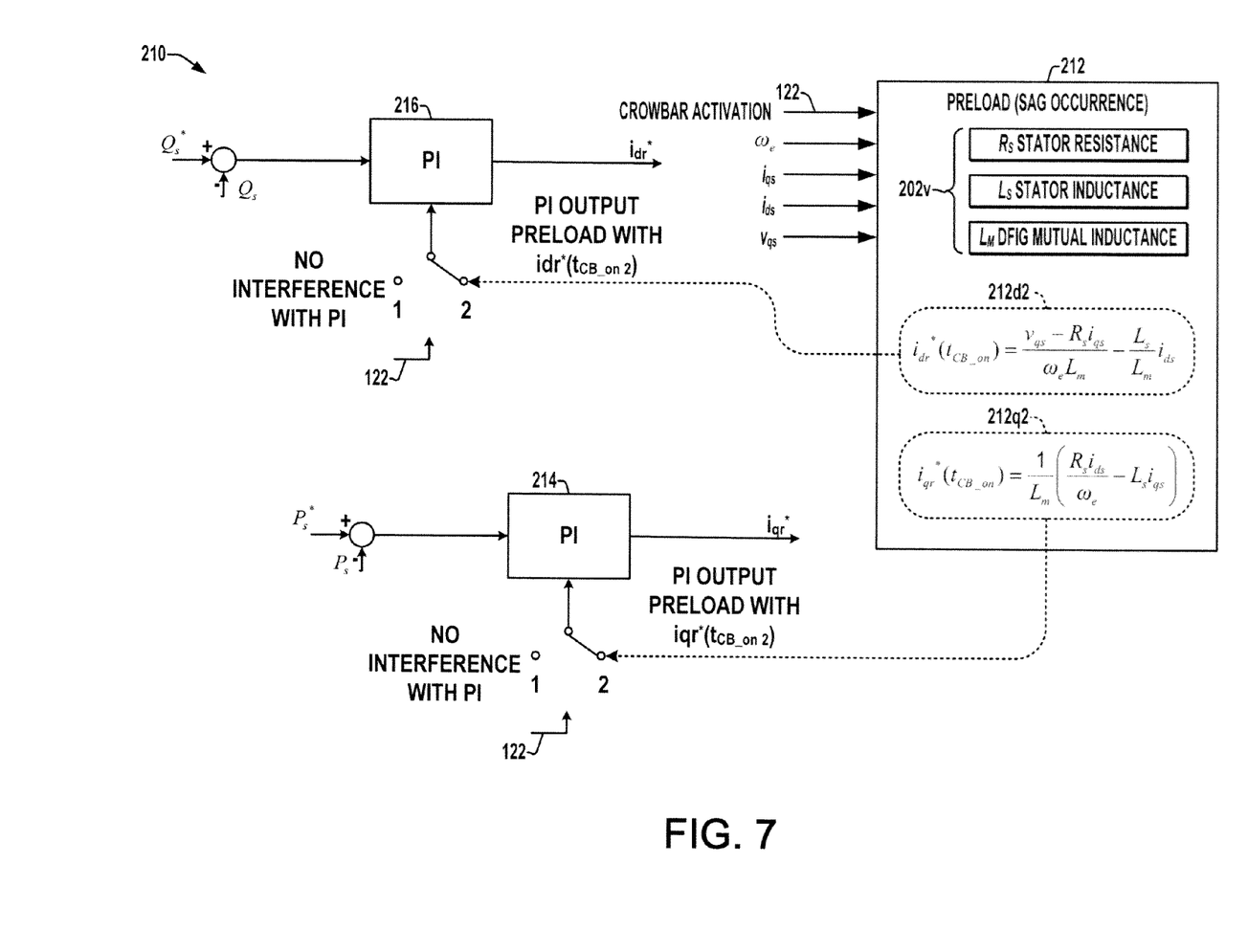

Referring also to FIGS. 6 and 7, the preload component 212 of the rotor side controller 210 helps to counteract the adverse effects of the grid voltage disturbances occurring when the crowbar circuit 120 is deactivated (e.g., at the ends of the activation time periods $t_{CB\_on\ 1}$ and $t_{CB\_on\ 2}$ in FIG. 5), thereby allowing resumption of the ability of the rotor side controller 210 to regulate the DFIG operation. The preload component 212 in the illustrated embodiments determines one or more rotor outer loop regulator output preload values (d and q-axis preload values $i_{dr}*$ and $i_{qr}*$ in the illustrated example) based at least in part on one or more stator current values (e.g., $i_{ds}$ and $i_{qs}$). The preload component 212 provides these to the rotor side controller 210 to begin regulating once the protection circuit 120 is switched from the active mode to the deactivated mode. The inventors have appreciated that one or more preload values computed according to known DFIG system parameters and sensed feedback values including the stator current $i_s$ can be advantageously employed to facilitate resumption of DFIG control by the rotor side controller 210, even in the presence of post crowbar deactivation rotor and stator current and voltage disturbances exemplified in FIG. 4.

In operation of the illustrated embodiment, the normal (e.g., steady state) rotor regulation relationships for the generation of d and q-axis rotor current setpoint values $i*_{dr}$ and $i*_{qr}$ by the outer loop regulators 214 and 216 in the rotor side controller 210 are given by the following equation (1):

$$i_{qr} = \frac{-v_{ds} + R_s i_{ds}}{\omega_e L_m} - \frac{L_s}{L_m} i_{qs} \quad (1)$$

$$i_{dr} = \frac{v_{qs} - R_s i_{qs}}{\omega_e L_m} - \frac{L_s}{L_m} i_{ds},$$

where $i*_{qr}$ is the q-axis rotor current setpoint, $i*_{dr}$ is the d-axis rotor current setpoint, $i_{qr}$ is the q-axis rotor current, $i_{dr}$ is the d-axis rotor current, $i_{qs}$ is the q-axis stator current, $i_{ds}$ is the d-axis stator current, $v_{qs}$ is the q-axis stator voltage, $v_{ds}$ is the d-axis stator voltage, $R_s$ is the stator resistance, $L_m$ is the DFIG mutual inductance, $L_s$ the DFIG stator inductance, and $\omega_e$ is the DFIG stator/grid frequency. This general equation is for a stator voltage orientation scheme, where the rotating reference frame aligned with q-axis stator voltage and the d-axis stator voltage $v_{ds}$ is 0 (for a stator flux orientation scheme, $v_{ds}$ is close to 0).

The general expression of equation (1) can be simplified to several alternatives. For example, the following equation (2) shows a simplification in which the d-axis stator voltage $v_{ds}$ is ignored:

$$i_{qr} = \frac{R_s i_{ds}}{\omega_e L_m} - \frac{L_s}{L_m} i_{qs} \quad (2)$$

$$i_{dr} = \frac{v_{qs} - R_s i_{qs}}{\omega_e L_m} - \frac{L_s}{L_m} i_{ds}.$$

In another example, the following equation (3) shows a simplification in which the stator resistance $R_s$ is ignored:

$$i_{qr} = -\frac{L_s}{L_m} i_{qs} \quad (3)$$

$$i_{dr} = \frac{v_{qs}}{\omega_e L_m} - \frac{L_s}{L_m} i_{ds}.$$

Ignoring the DFIG mutual leakage inductance $L_m$ yields the following further simplification in equation (4):

$$i_{qr} = -i_{qs} \quad (4)$$

$$i_{dr} = \frac{v_{qs}}{\omega_e L_m} - i_{ds}.$$

In accordance with the present disclosure, the operation of the rotor side regulator is modified when the protection circuit 120 is switched from the active to the deactivated state by providing precalculated initial values for the setpoint outputs of the outer loop regulators 214 and 216. In the illustrated system, the preload component 212 calculates these preload values according to the DFIG stator current values $i_{ds}$, $i_{qs}$ derived by abc→dq conversion of measured multiphase stator current values. Moreover, in certain embodiments, the preload component 212 selectively changes the sign of at least one stator current value $i_{ds}$, $i_{qs}$ of the DFIG 40 based at least partially on a direction of a grid voltage disturbance. As seen in the embodiment of FIGS. 6 and 7, for example, the preload component 212 changes the sign of the stator current values $i_{ds}$, $i_{qs}$ using the general expression of equation (1) above (at the end of $t_{CB\_on\ 1}$ in FIG. 5) when the crowbar protection circuit 120 was activated in response to a grid voltage sag occurrence (FIG. 6), and leaves the stator current signs unchanged (at the end of $t_{CB\_on\ 2}$ in FIG. 5) when the protection circuit 120 was activated in response to a grid voltage sag clearance (FIG. 7).

As seen in FIGS. 6 and 7, the crowbar activation signal state 122 in this implementation functions to switch the rotor current setpoint outputs $i_{dr}^*$, $i_{qr}^*$ of the rotor side outer loop regulators 216 and 214 from values determined by normal PI regulator computations to the calculated preload values from the preload component 212. In particular, the preload component 212 in this embodiment employs the following equation (5) to compute the preload values $i_{dr}^*$ and $i_{qr}^*$ for the crowbar deactivation following the grid voltage sag occurrence (FIG. 6):

$$i_{qr}^*(t_{CB\_on1}) = \frac{1}{L_m}\left(\frac{-R_s i_{ds}}{\omega_e} + L_s i_{qs}\right) \quad (5)$$

$$i_{dr}^*(t_{CB\_on1}) = \frac{v_{qs} + R_s i_{qs}}{\omega_e L_m} + \frac{L_s}{L_m} i_{ds},$$

and uses the following equation (6) for computing the preload rotor current setpoint outputs $i_{dr}^*$, $i_{qr}^*$ for the crowbar deactivation following the grid voltage sag clearance (FIG. 7):

$$i_{qr}^*(t_{CB\_on2}) = \frac{1}{L_m}\left(\frac{R_s i_{ds}}{\omega_e} - L_s i_{qs}\right) \quad (6)$$

$$i_{dr}^*(t_{CB\_on2}) = \frac{v_{qs} - R_s i_{qs}}{\omega_e L_m} - \frac{L_s}{L_m} i_{ds}.$$

In this implementation, the preload value computation following the grid voltage sag clearance is the same as that of the steady state relationships shown in equation (1) above.

Figure 8:
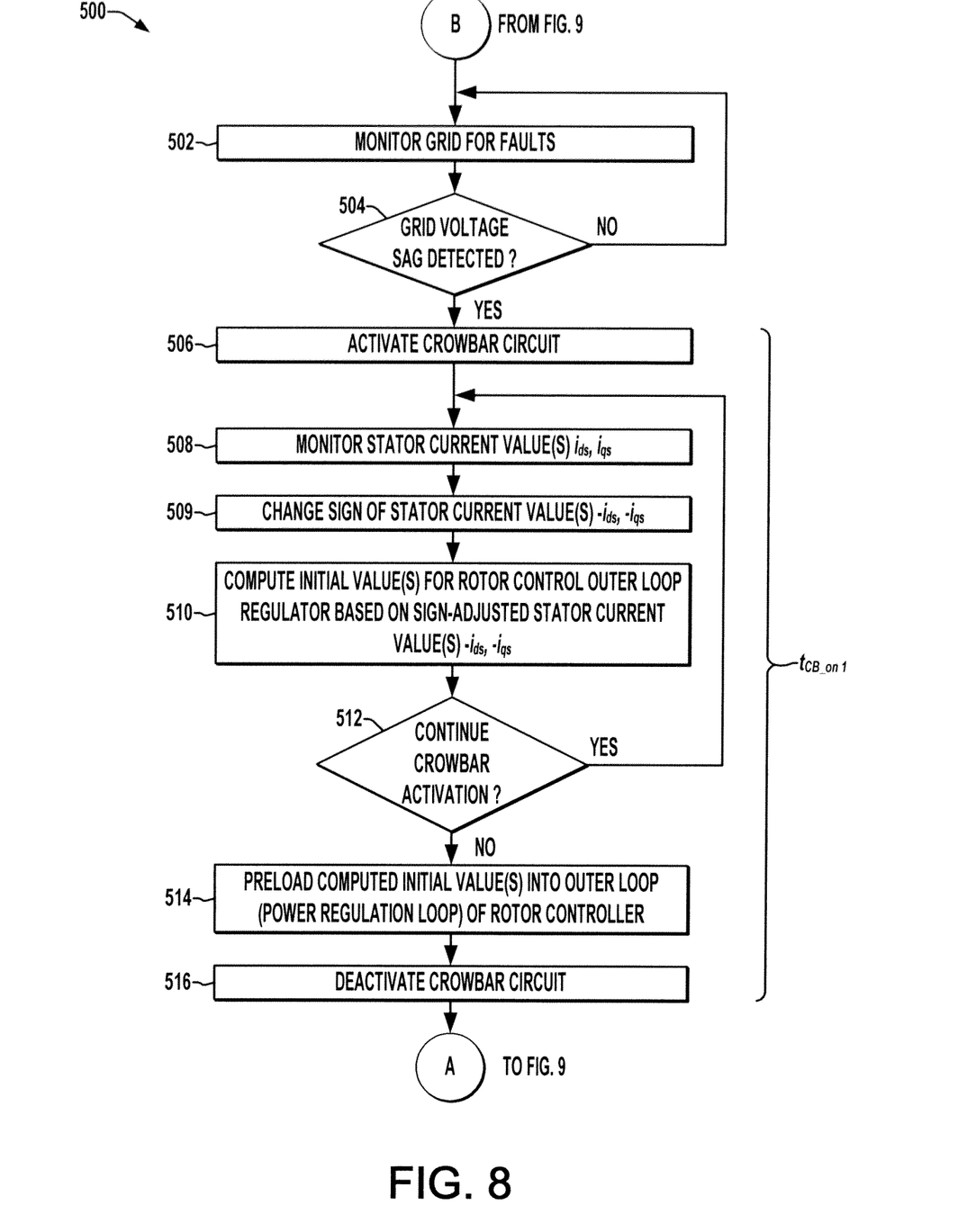
FIGS. 8 and 9 provide a flow diagram illustrating an exemplary method of operating a dual stage DFIG converter in accordance with further aspects of the disclosure.
Figure 9:
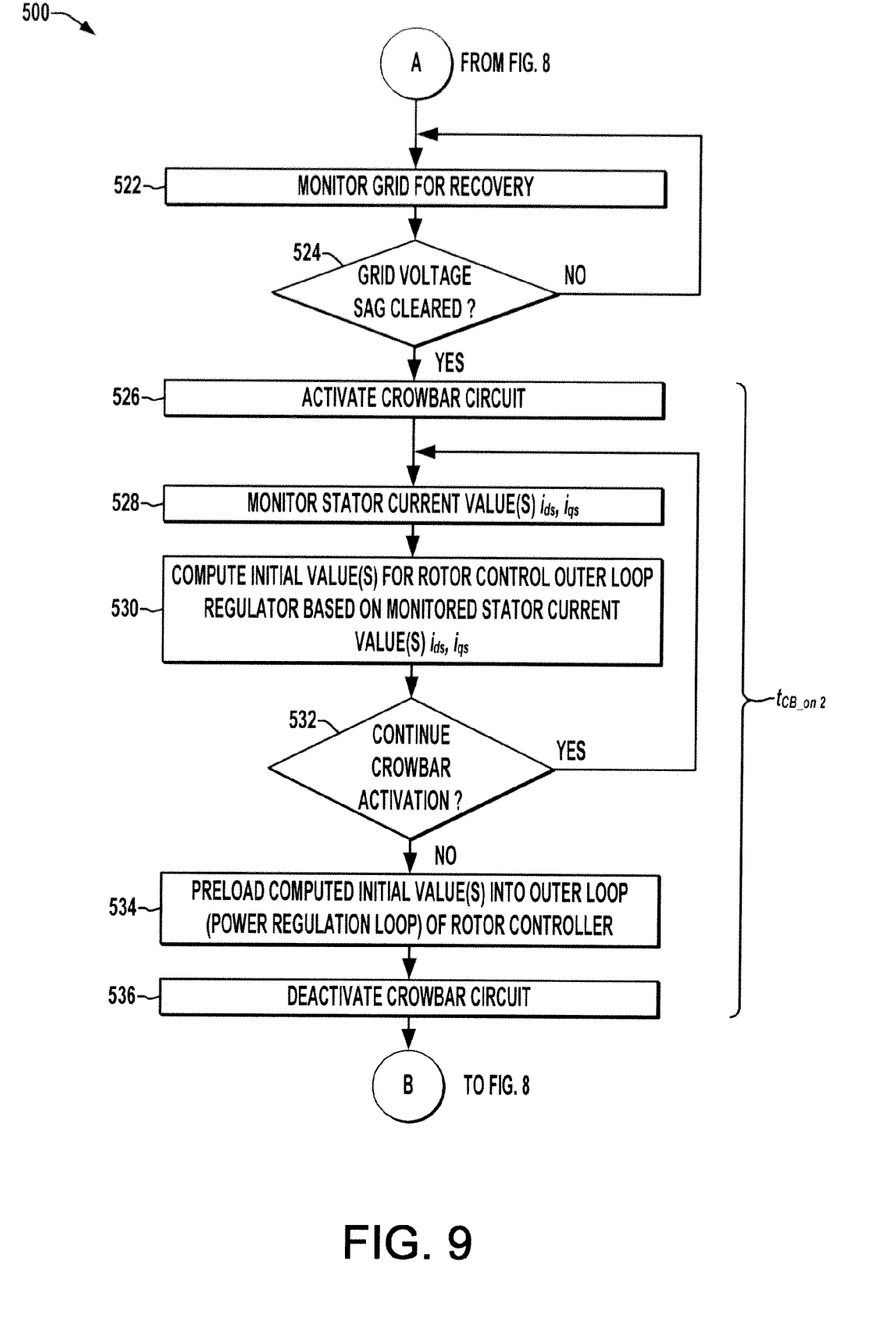

Referring now to FIGS. 8 and 9, a flow diagram illustrates an exemplary process 500 for operating a dual stage DFIG converter in accordance with further aspects of the disclosure, which can be implemented in any control system or device, such as the control system 200 illustrated and described above in connection with FIGS. 1-3. Although the exemplary method 500 is illustrated and described below as a series of acts or events, the methods of the present disclosure are not limited by the illustrated ordering of such acts or events. For example, some acts may occur in different orders and/or concurrently with other acts or events apart from those illustrated and/or described herein, and not all illustrated steps may be required to implement a methodology in accordance with the disclosure.

The process 500 begins at 502 in FIG. 8 with the system being monitored for grid faults, which continues until a grid voltage sag occurrence is detected at 504. In response to this fault detection, the controller 200 activates the crowbar protection circuit 120 at 506 to connect a protection load to a rotor 42 of the DFIG 40 to conduct current from rotor leads 42a to protect the first converter circuit 140, with a first timer $t_{CB\_on\ 1}$ beginning. At 508, one or more stator current values $i_{ds}$, $i_{qs}$ of the DFIG 40 are monitored while the protection circuit 120 remains activated, and the preload component 212 changes the sign of the values $i_{ds}$, $i_{qs}$ at 509 since the protection circuit 120 was activated at 506 in response to a grid voltage sag occurrence. At 510, the preload component 212 determines one or more rotor outer loop regulator output preload values (e.g., $i_{dr}^*$ and $i_{qr}^*$) based at least partially on the stator current values $i_{ds}$ and $i_{qs}$ while the protection circuit 120 is activated (e.g., using equation (5) above). A determination is made at 512 as to whether the first activation time $t_{CB\_on\ 1}$ has elapsed, and if not (YES at 512), the preload component 212 continues monitoring the stator current and computing the preload value(s) accordingly at 508, 509 and 510.

Once the first activation time $t_{CB\_on\ 1}$ has elapsed (NO at 512), the process 500 proceeds to 514 where the rotor outer loop regulator output preload values $i_{dr}^*$ and $i_{qr}^*$ are preloaded to the rotor outer loop regulators 214 and 216 to begin regulation of the DFIG 40 when the protection circuit 120 is deactivated at 516. In the example illustrated in FIG. 5 above, the regulation of the rotor currents continues while the grid voltage fault condition remains, with the DFIG control system 200 operating in regulation mode to help prop up the faulted grid (e.g., by providing reactive power to the grid or other remedial operation).

The process 500 continues at 522 in FIG. 9 with the system monitoring the grid voltage for recovery of the voltage sag. Once the grid recovers (grid voltage sag clearance, YES at 524), the controller 200 activates the crowbar circuit 120 at 526 and begins monitoring the DFIG stator current values ($i_{ds}$, $i_{qs}$) at 528. In this case, the protection circuit 120 was activated at 526 in response to a grid voltage sag clearance, and thus the preload component 212 leaves the sign of the stator current values $i_{ds}$ and $i_{qs}$ unchanged when computing the preload values at 530 (e.g., using equation (6) above). At 532, a determination is made as to whether the second activation time $t_{CB\_on\ 2}$ has elapsed. If not (YES at 512), the crowbar activation continues and the preload component 212 monitors the stator current and recomputes the preload value(s) accordingly at 528 and 530. If the crowbar activation time $t_{CB\_on\ 2}$ has elapsed (NO at 532), the computed initial outer loop regulator values are preloaded at 524 and the crowbar protection circuit 120 is deactivated at 536. The process 500 continues in this fashion by returning to monitor for the onset of another grid fault at 502 in FIG. 8.

In accordance with further aspects of the present disclosure, a non-transitory, tangible computer readable medium is provided, such as a computer memory, a memory within a power converter control system (e.g., control system 200 or components thereof in FIGS. 1-3, 6 and 7 above), a CD-ROM, floppy disk, flash drive, database, server, computer, etc.) which has computer executable instructions for performing the above described methods.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system for a double fed induction generator (DFIG), comprising:
   a rotor connection including a plurality of electrical connections coupleable to rotor leads of the DFIG;
   a stator connection including a plurality of electrical connections coupleable to stator leads of the DFIG;
   a DC circuit with at least one capacitance;
   a first converter circuit coupled with the rotor connection and with the DC circuit and comprising a first rectifier circuit and a first switching circuit;
   a second converter circuit coupled with the stator connection and with the DC circuit and comprising a second rectifier circuit and a second switching circuit;
   a protection circuit coupled with the rotor connection and operative in a first mode to connect a protection load to the rotor connection to conduct current from the rotor leads of the DFIG to protect the first converter circuit and in a second mode to disconnect the protection load from the rotor connection; and
   a first switching controller comprising at least one rotor outer loop regulator operative to generate at least one rotor outer loop regulator output and a pulse width modulation component operative to provide rotor switching control signals to operate the first switching circuit at least partially according to the at least one rotor outer loop regulator output in a first mode to provide power from the rotor connection to the DC circuit, and
   a preload component operative to determine at least one rotor outer loop regulator output preload value based at least partially on at least one stator current value of the DFIG and to provide the first switching controller with the at least one rotor outer loop regulator output preload value to begin regulation when the protection circuit is switched from the first mode to the second mode.

2. The power conversion system of claim 1, where the preload component is operative to selectively change a sign of the at least one stator current value of the DFIG based at least partially on a direction of a grid voltage disturbance.

3. The power conversion system of claim 2, where the preload component is operative to change the sign of the at least one stator current value of the DFIG when the protection circuit is switched from the second mode to the first mode in response to a grid voltage sag occurrence.

4. The power conversion system of claim 3, where the preload component is operative to leave the sign of the at least one stator current value of the DFIG unchanged when the protection circuit is switched from the second mode to the first mode in response to a grid voltage sag clearance.

5. The power conversion system of claim 4, where the preload component is operative to determine a d-axis rotor outer loop regulator output preload value and a q-axis rotor outer loop regulator output preload value based at least partially on a d-axis stator current value and a q-axis stator current value of the DFIG, and to provide the first switching controller with the d-axis and q-axis rotor outer loop regulator output preload values to begin regulation when the protection circuit is switched from the first mode to the second mode.

6. The power conversion system of claim 5, where the preload component is operative to change the signs of both the d-axis stator current value and the q-axis stator current value of the DFIG when the protection circuit is switched from the second mode to the first mode in response to a grid voltage sag occurrence, and to leave the signs of the d-axis stator current value and the q-axis stator current value unchanged when the protection circuit is switched from the second mode to the first mode in response to a grid voltage sag clearance.

7. The power conversion system of claim 3, where the preload component is operative to determine a d-axis rotor outer loop regulator output preload value and a q-axis rotor outer loop regulator output preload value based at least partially on a d-axis stator current value and a q-axis stator current value of the DFIG, and to provide the first switching controller with the d-axis and q-axis rotor outer loop regulator output preload values to begin regulation when the protection circuit is switched from the first mode to the second mode.

8. The power conversion system of claim 7, where the preload component is operative to change the signs of both the d-axis stator current value and the q-axis stator current value of the DFIG when the protection circuit is switched from the second mode to the first mode in response to a grid voltage sag occurrence.

9. The power conversion system of claim 3:
   where the first converter circuit is operative in the first mode to provide power from the rotor connection to the DC circuit and in a second mode to provide power from the DC circuit to the rotor connection; and
   where the second converter circuit is operative in a first mode to provide power from the DC circuit to the stator connection and in a second mode to provide power from the stator connection to the DC circuit.

10. The power conversion system of claim 2, where the preload component is operative to determine a d-axis rotor outer loop regulator output preload value and a q-axis rotor outer loop regulator output preload value based at least partially on a d-axis stator current value and a q-axis stator current value of the DFIG, and to provide the first switching controller with the d-axis and q-axis rotor outer loop regulator output preload values to begin regulation when the protection circuit is switched from the first mode to the second mode.

11. The power conversion system of claim 10, where the preload component is operative to change the signs of both the d-axis stator current value and the q-axis stator current value of the DFIG when the protection circuit is switched from the second mode to the first mode in response to a grid voltage sag occurrence.

12. The power conversion system of claim 2:
   where the first converter circuit is operative in the first mode to provide power from the rotor connection to the DC circuit and in a second mode to provide power from the DC circuit to the rotor connection; and
   where the second converter circuit is operative in a first mode to provide power from the DC circuit to the stator connection and in a second mode to provide power from the stator connection to the DC circuit.

13. The power conversion system of claim 1:
   where the first converter circuit is operative in the first mode to provide power from the rotor connection to the DC circuit and in a second mode to provide power from the DC circuit to the rotor connection; and
   where the second converter circuit is operative in a first mode to provide power from the DC circuit to the stator connection and in a second mode to provide power from the stator connection to the DC circuit.

14. A control system for operating a dual stage converter for a double fed induction generator (DFIG) having first and second converter circuits and an intermediate DC circuit between the first and second converter circuits, the control system comprising:
   a first switching controller comprising at least one rotor outer loop regulator operative to generate at least one rotor outer loop regulator output and a pulse width modulation component operative to provide rotor switching control signals to operate the first converter circuit at least partially according to the at least one rotor outer loop regulator output in a first mode to provide power from a rotor of the DFIG to the DC circuit and in a second mode to provide power from the DC circuit to the rotor a second switching controller operative to provide a second set of switching control signals to operate the second converter circuit in a first mode to provide power from the DC circuit to a grid and in a second mode to provide power from the grid to the DC circuit; and a preload component operative to determine at least one rotor outer loop regulator output preload value based at least partially on at least one stator current value of the DFIG and to provide the first switching controller with the at least one rotor outer loop regulator output preload value to begin regulation when a protection circuit is switched from a first mode in which a protection load is connected to the rotor of the DFIG to conduct current from the rotor leads to protect the first converter circuit to a second mode in which the protection load is disconnected from the rotor of the DFIG.

15. The control system of claim 14, where the preload component is operative to selectively change a sign of the at least one stator current value of the DFIG based at least partially on a direction of a grid voltage disturbance.

16. The control system of claim 15, where the preload component is operative to change the sign of the at least one stator current value of the DFIG when the protection circuit is switched from the second mode to the first mode in response to a grid voltage sag occurrence and to leave the sign of the at least one stator current value of the DFIG unchanged when the protection circuit is switched from the second mode to the first mode in response to a grid voltage sag clearance.

17. The control system of claim 16, where the preload component is operative:

to determine a d-axis rotor outer loop regulator output preload value and a q-axis rotor outer loop regulator output preload value based at least partially on a d-axis stator current value and a q-axis stator current value of the DFIG;

to change the signs of both the d-axis stator current value and the q-axis stator current value of the DFIG when the protection circuit is switched from the second mode to the first mode in response to a grid voltage sag occurrence;

to leave the signs of the d-axis stator current value and the q-axis stator current value unchanged when the protection circuit is switched from the second mode to the first mode in response to a grid voltage sag clearance; and to provide the first switching controller with the d-axis and q-axis rotor outer loop regulator output preload values to begin regulation when the protection circuit is switched from the first mode to the second mode.

18. A method for operating a dual stage converter for a double fed induction generator (DFIG) having first and second converter circuits and an intermediate DC circuit therebetween, the method comprising:

activating a protection circuit to connect a protection load to a rotor of the DFIG to conduct current from rotor leads to protect the first converter circuit in response to a grid voltage sag occurrence or a grid voltage sag clearance;

monitoring at least one stator current value of the DFIG while the protection circuit is activated;

determining at least one rotor outer loop regulator output preload value based at least partially on the at least one stator current value while the protection circuit is activated; and preloading the at least one rotor outer loop regulator output preload value to at least one rotor outer loop regulator to begin regulation of the DFIG when the protection circuit is deactivated.

19. The method of claim 18, comprising:

changing the sign of the at least one stator current value when the protection circuit is activated in response to a grid voltage sag occurrence; and leaving the sign of the at least one stator current value unchanged when the protection circuit is activated in response to a grid voltage sag clearance.

20. The method of claim 19, where determining the at least one rotor outer loop regulator output preload value comprises:

selectively changing the signs of both a d-axis stator current value and a q-axis stator current value of the DFIG when the protection circuit is activated in response to a grid voltage sag occurrence;

leaving the signs of the d-axis stator current value and the q-axis stator current value unchanged when the protection circuit is activated in response to a grid voltage sag clearance; and determining a d-axis rotor outer loop regulator output preload value and a q-axis rotor outer loop regulator output preload value based at least partially on the d-axis stator current value and the q-axis stator current value of the DFIG.

* * * * *